T. Stubblefield,
Steam-Boiler Indicator.
N° 14,033.                    Patented Jan. 1, 1856.
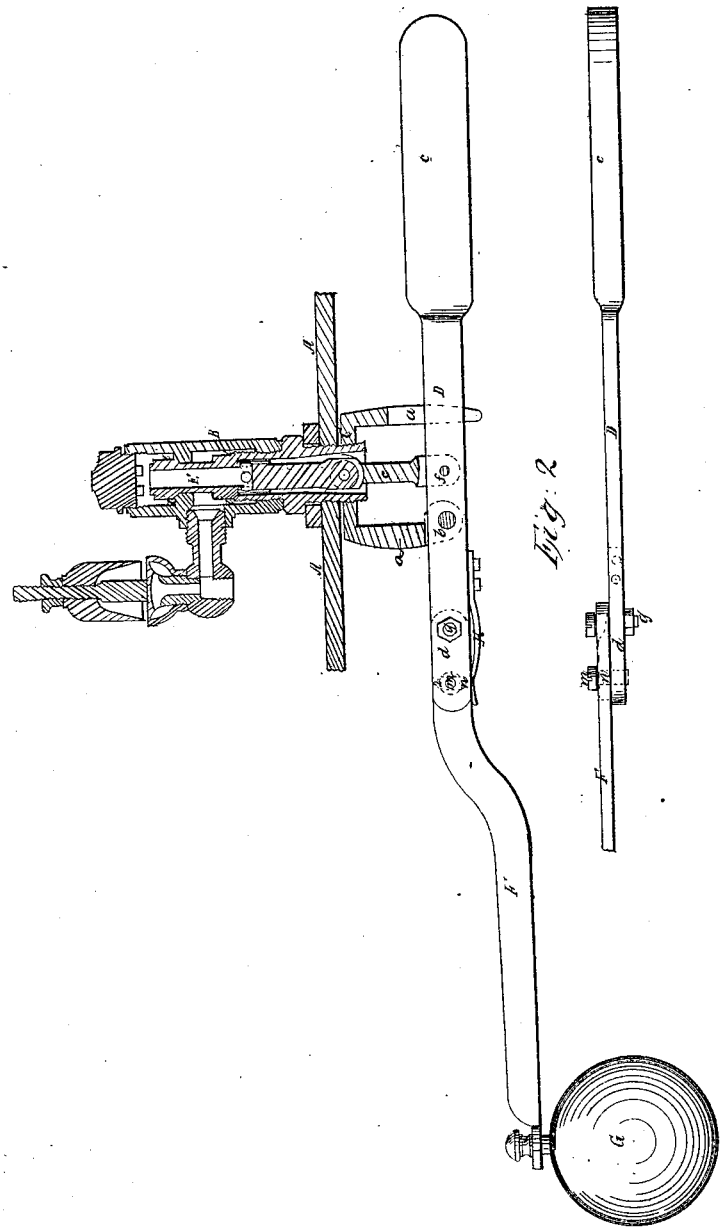

UNITED STATES PATENT OFFICE.

THOS. STUBBLEFIELD, OF COLUMBUS, GEORGIA.

STEAM-BOILER ALARM.

Specification of Letters Patent No. 14,033, dated January 1, 1856.

*To all whom it may concern:*

Be it known that I, THOMAS STUBBLEFIELD, of Columbus, in the county of Muscogee and State of Georgia, have invented certain new and useful Improvements in Alarm Water-Gages for Steam-Boilers, of which the following is a full, clear, and exact description, reference being had to the accompanying drawing, which makes part of this specification, and in which—

Figure 1 represents a vertical section of a gage embracing my improvements; and Fig. 2 represents a top view of the jointed lever.

In the accompanying drawings a fragment (A) of a steam boiler is shown, into which the case (B) of the alarm valve is screwed. On the lower end of this case which projects through the boiler, a nut (C) is screwed. From each side of this nut an arm projects which is forked at its lower end; one of these arms (a) receives between its forks a lever (D) through which, and the forks, a pin (b) passes, on which pin the lever turns as a fulcrum. The lever also passes between the forks of the arm (a') which serve to guide it. The end (c) of the lever (D) is weighted or made considerably heavier than the opposite end (d), so that it will constantly tend to drop down.

Between the arms of the nut (C), the stem (e) of the alarm valve, descends from the center of the case. This stem is forked on its lower end to embrace the lever (D), and a pin (f) is passed through this forked end of the stem, and the lever, to connect them together. This pin will support the heavy end of the lever (D) whose weight will tend to hold the valve closely upon its seat.

The valve is of the balance variety, and is constructed as represented in the drawing, with a tubular stem (E) connecting two conical covers (i i') resting on seats of corresponding form. The area of the portion of the lower cover (i') on which the steam presses upward, is exactly equal to the area of that portion of the upper cover (i) on which the steam presses downward, so that the pressure on one, will exactly counterbalance that on the other, and the valve can be opened under any pressure of steam by a force, barely sufficient to overcome its weight, and that of its appendages.

When the valve opens, it allows the steam to escape through a steam whistle, to give notice to whom it may concern, that there is a deficiency of water in the boiler i because the apparatus is so constructed that the valve will not open automatically except when the water becomes so low as to require replenishing.

To the light end (d) of the lever (D) another lever (F) is connected by means of a pivot (g) and a gage stop pin (m) which passes through a transverse slot (n) that permits the lever (F) to be raised and lowered, within a certain range, without moving the lever (D) but when this range is exceeded, then the lever (D) is also moved by and with the lever (F). On the end of the latter lever opposite to that to which it is jointed to the lever (D), a globular float (G) is fixed whose weight is such that the force by which it acts on the lever (F) to depress its outer extremity is considerably greater than that which acts upon the lever (D) to depress its outer end; while the size of the float should be such, that its displacement of water will be sufficient to float it and the lever (F) to which it is attached. A spring (H) is attached to the under side of the lever (D) near the hinge, the free end of which bears against the lever (F) and prevents it from descending too suddenly to the bottom of the slot; in this way, the vibration of the float is held in check for a purpose hereafter mentioned.

When the boiler is filled to the proper height with water the float (G) and the lever (F) will be raised to their highest position, and the valve closed. When the water lowers, the float will sink, but without disturbing the valve until it has descended far enough to let the upper extremity (2) of the slot (n) rest upon the pin (m) when the weight of the float will depress, the lever (F) raise the heavy end (c) of the lever (D) and open the valve to allow the steam to escape, and sound an alarm, of a deficiency of water, when the engineer will of course increase the feed, the water will rise in the boiler and with it the float, allowing the heavy end (c) of the lever (D) to descend and shut the alarm valve to stop the escape of steam and the whistle. While the float is high enough to raise the upper end of the slot (n) off the pin (m) it will not affect the valve, however violently the water in the boiler may be agitated whether from ebullition or the motion of the vessel in which the boiler is placed. This results from the connection of the float lever (F) with the weighted lever (D) by means of the hinge, slot, and stop pin, which permits the free vibration of the float within certain limits, without opening the valve to give a false alarm.

The weighted lever (D) keeps the valve securely closed, except when the water is so low as to cause the float to act upon it. When the float is low, and near the point where its weight will open the valve, if a sudden vibration should be given to the former, it will act upon the spring (H) on the under side of the lever, and tend to deflect it. The downward momentum of the float will thus be arrested, before the inertia of the weighted lever (D) is overcome, and the valve raised. In this way, the hissing and spitting of the steam, and faint whistling caused thereby, before the water has sunk to the alarm point, will be avoided, thus preventing the false alarms and annoyances, experienced in the use of this class of alarm gages as heretofore constructed.

Having thus described my improved alarm water gage for steam boilers, what I claim therein as new, and desire to secure by Letters Patent, is—

The combination of the flexible lever with the float and alarm valve, substantially in the manner and for the purpose herein set forth.

In testimony whereof, I have hereunto subscribed my name.

THOS. STUBBLEFIELD.

Witnesses:
P. H. WATSON,
A. E. JOHNSON.